April 8, 1941.   W. HOOP ET AL   2,237,821
DOUGH STRIP TWISTING MACHINE
Filed July 21, 1939   4 Sheets-Sheet 1

INVENTORS
Walter Hoop
Leo C. Veale
BY Joseph B. Gardner
ATTORNEY

April 8, 1941.  W. HOOP ET AL  2,237,821
DOUGH STRIP TWISTING MACHINE
Filed July 21, 1939  4 Sheets-Sheet 2
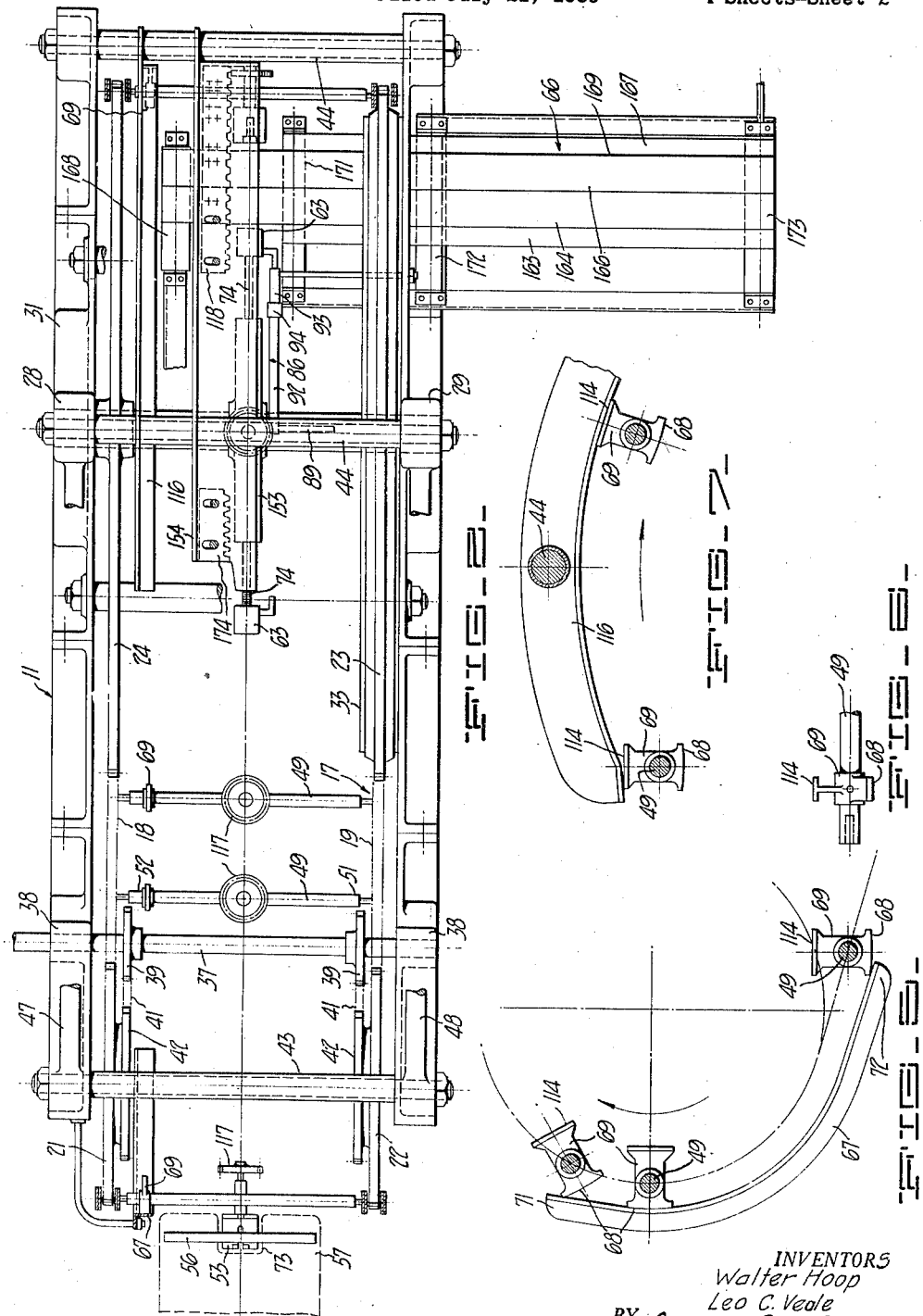
INVENTORS
Walter Hoop
Leo C. Veale
BY Joseph B. Gardner
ATTORNEY.

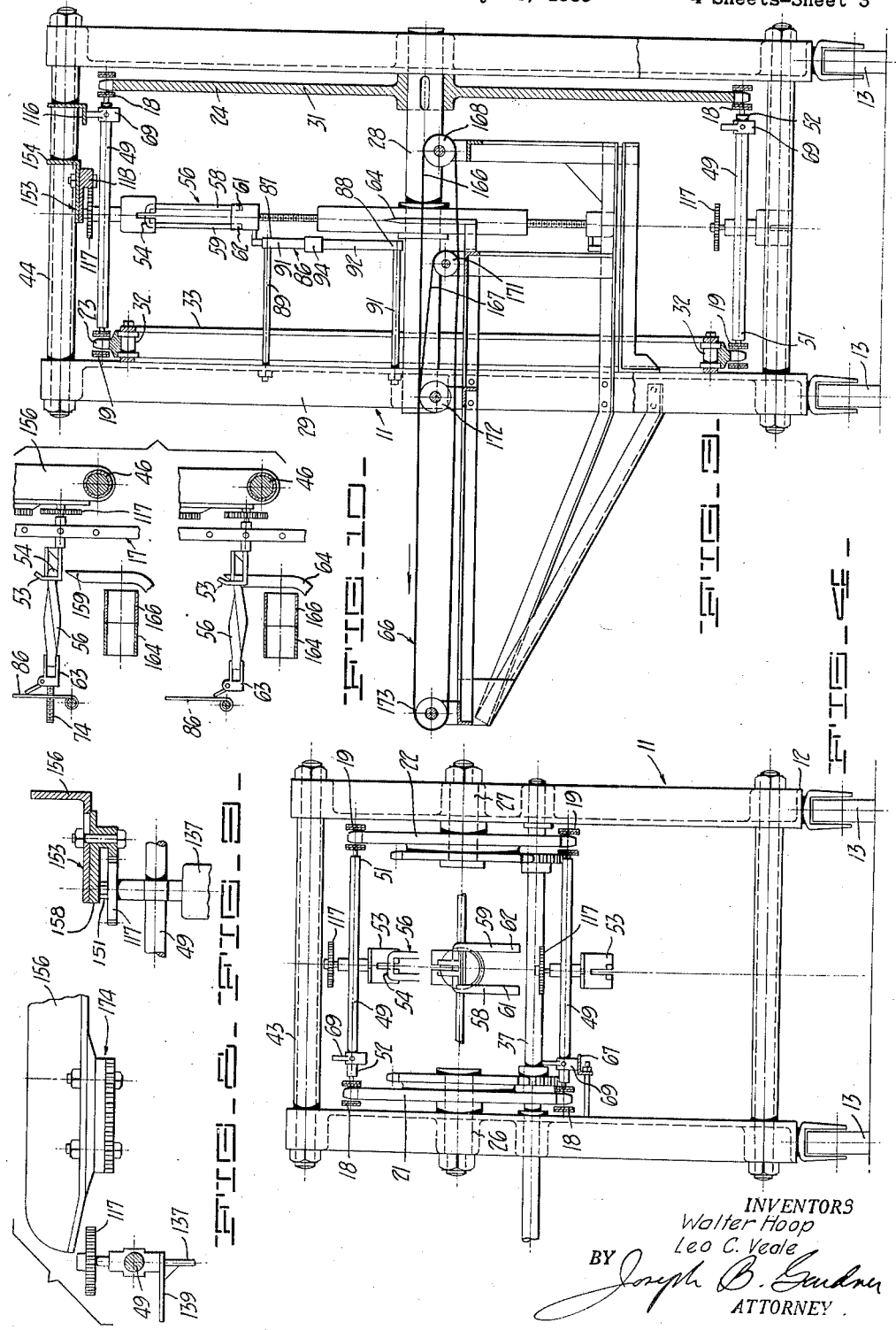

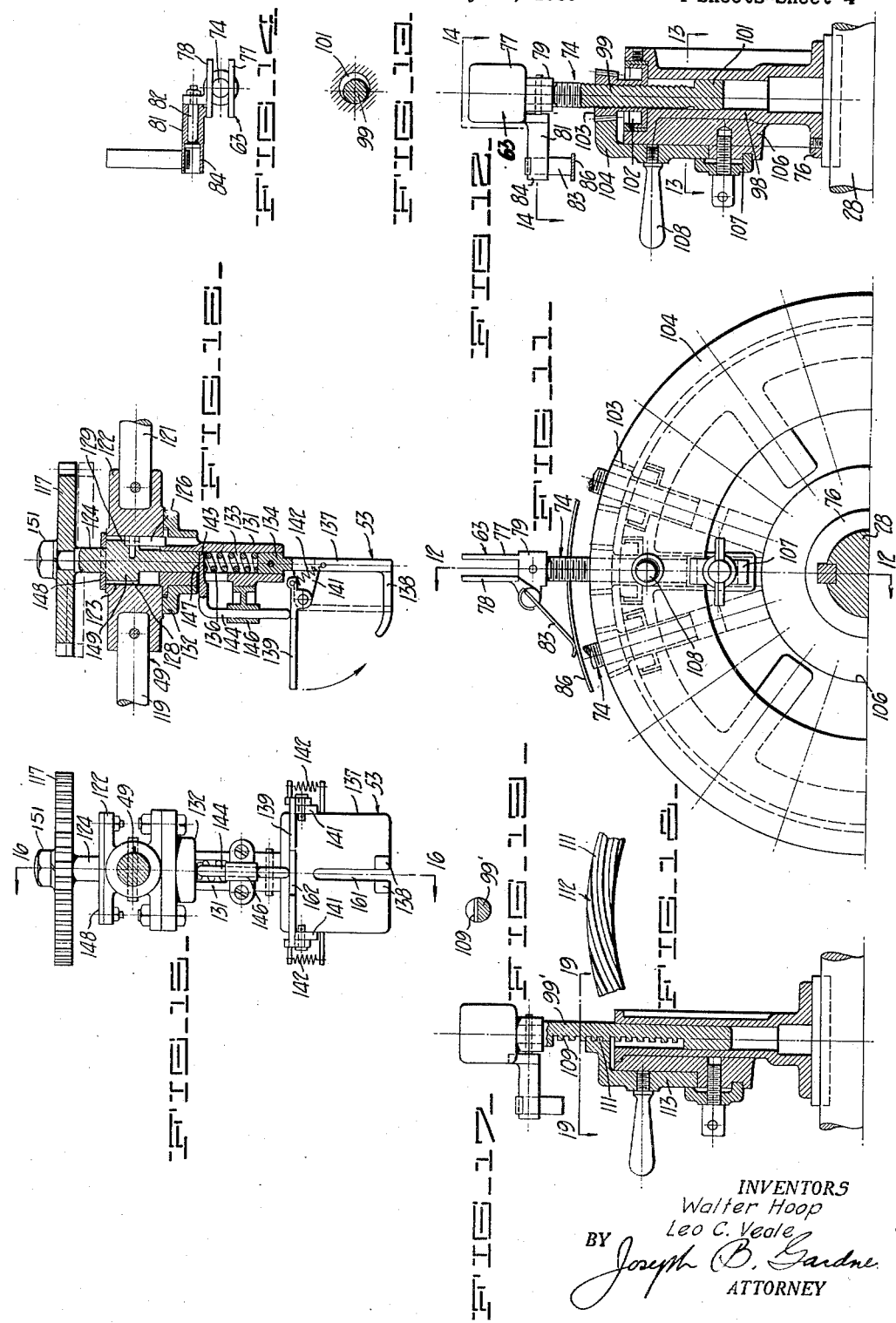

Patented Apr. 8, 1941

2,237,821

UNITED STATES PATENT OFFICE 2,237,821

DOUGH STRIP TWISTING MACHINE

Walter Hoop, Berkeley, and Leo C. Veale, Albany, Calif.; said Veale assignor to said Hoop Application July 21, 1939, Serial No. 285,714

15 Claims. (Cl. 107—8)

The invention relates to machines for fashioning bread dough or the like into loaves prior to baking of the loaves.

An object of the present invention is to provide a machine of the character described which will automatically and successively receive, fold, twist and cut a plurality of elongated strips of dough, so as to continuously receive such strips and continuously discharge the same in folded and twisted loaf form.

Another object of the invention is to provide a machine of the character above which will be readily adjustable to receive and handle dough strips of various lengths, whereby various size loaves may be formed.

A further object of the invention is to provide a machine of the character above wherein substantially all of the working parts of the machine are open and accessible to permit ready and simple cleaning, inspection, adjustment and repair.

Still another object of the invention is to provide a machine of the character described wherein all of the working parts of the machine will be simply and sturdily constructed and arranged for positive operation whereby the machine will be capable of long and continued performance and will have a substantially unlimited period of useful life.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 2 is a plan view of the machine illustrated in Figure 1 and is shown with some of the parts broken away and in section.

Figure 3 is an end elevation of the machine with some of the parts broken away and in section.

Figure 4 is an end elevation of the machine taken at the opposite end thereof from Figure 3 and shown with some of the parts broken away and in section.

Figure 5 is a vertical sectional view of a part of the machine illustrating a rotating means for the dough hooks.

Figure 6 is a side elevation of a part of the apparatus illustrated in Figure 5.

Figure 7 is a vertical sectional view of a second rotating means for the dough hooks.

Figure 8 is a fragmentary vertical sectional view of a rack and pinion means for rotating the hooks.

Figure 9 is a fragmentary radial section of another rack and pinion means taken substantially on the plane of line 9—9 of Figure 1.

Figure 10 is a fragmentary vertical sectional view showing the dough strip holding and turning parts in different positions immediately prior to discharge of the dough strips.

Figure 11 is a vertical sectional view showing a part of the supporting mechanism for one of the dough hook clamp members.

Figure 12 is a vertical sectional view taken substantially on the plane of line 12—12 of Figure 11.

Figure 13 is a cross-sectional view taken substantially on the plane of line 13—13 of Figure 12.

Figure 14 is a transverse sectional view taken substantially on the plane of line 14—14 of Figure 12.

Figure 15 is a cross-sectional view of one of the dough hooks and associated supporting mechanism.

Figure 16 is a cross-sectional view of the assembly shown in Figure 15 but taken at right angles thereto, as indicated by the plane of line 16—16 of Figure 15.

Figure 17 is a longitudinal sectional view of one of the dough clamp member supports similar to Figure 12 but showing a modified form thereof.

Figure 18 is a fragmentary side elevation of a scroll ring illustrated in Figure 17.

Figure 19 is a cross-sectional view of a part of the mechanism shown in Figure 17 and is taken substantially on the plane of line 19—19 of Figure 17.

Figure 1:
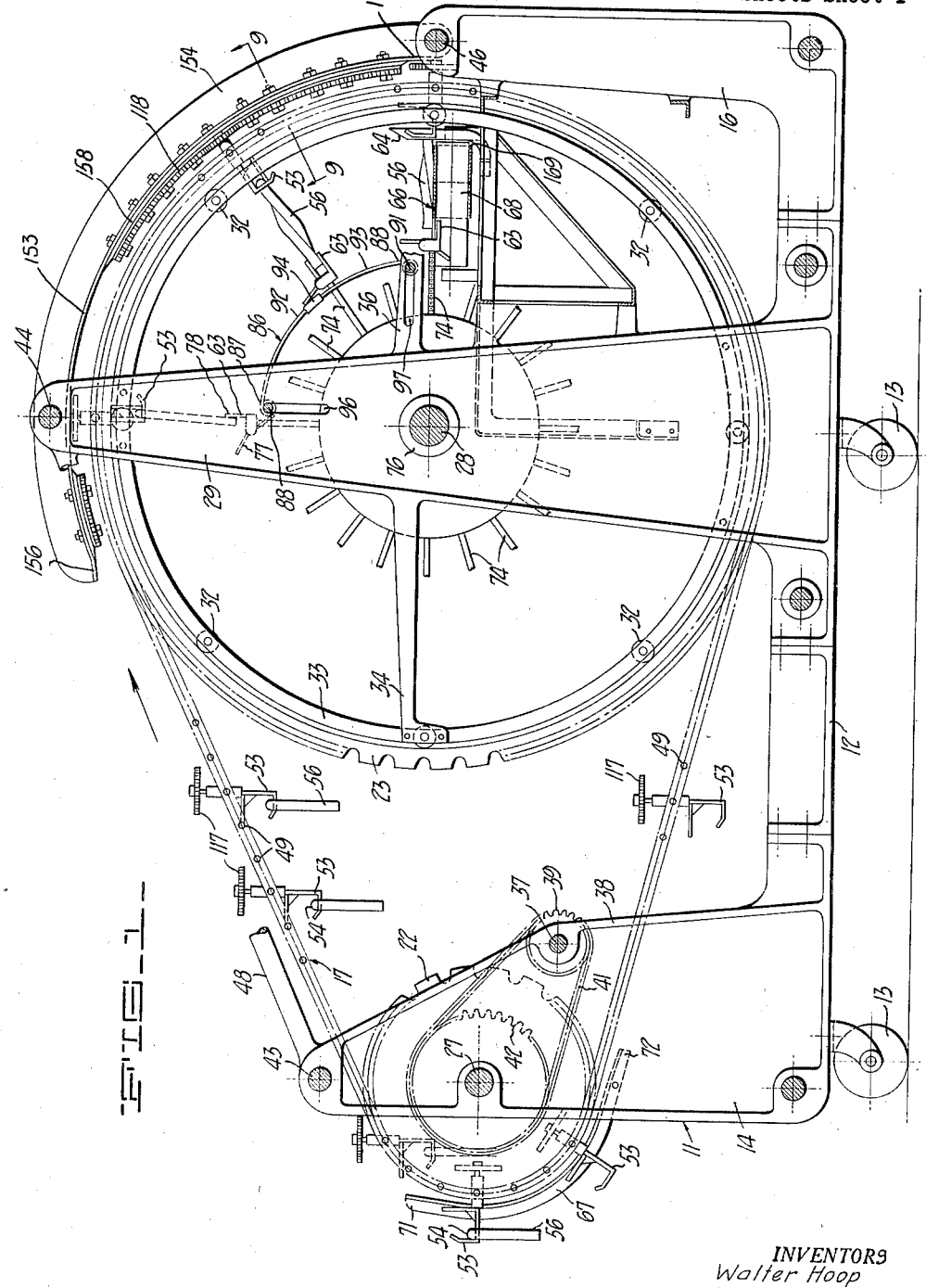
Figure 1 is a side elevation of a dough strip twisting machine constructed in accordance with the present invention, and shown with parts of the machine broken away and in section.

The machine of the present invention consists briefly in a support for a plurality of strips of dough in combination with a member mounted for movement to and from the support to engage and carry off successive strips of dough and to support the dough in a manner providing for the folding of the dough strip into a pair of sides or legs, and a second member which is mounted generally in the path of the first member and is arranged to receive and hold the free ends of the strip, and a mechanism for turning one of the members relative to the other to twist the legs or sides of the dough strip around each other, and a knife operatively arranged to sever the strip at the folded intermediate portion thereof to prevent unwinding of the twisted sides. Preferably, the machine is constructed in the form of an endless conveyor whereby an automatic and continuous operation may be carried out, and wherein the strips of dough may be picked up by the conveyor at one part thereof and successively folded, twisted and cut at successive parts of the machine.

With reference more particularly to the accompanying drawings, the machine here consists of a supporting frame 11 including a bed-plate 12, here supported on roll-about wheels or casters 13 and on which is supported adjacent the opposite ends thereof horizontally spaced upright frame members 14 and 16. The frame may be of any suitable length depending upon the size and capacity of the machine to be constructed and may if desirable be made adjustable in length, that is between the end frames 14 and 16. Supported by the frame is an elongated endless conveyor 17 here formed of a pair of endless chains 18 and 19 which are supported at the opposite ends of the machine on spaced pairs of sprockets 21 and 22 at the end frame 14 and on spaced pairs of sprockets 23 and 24 adjacent the end frame 16. The sprockets 21 and 22 are carried on the inner ends of aligned stub shafts 26 and 27 supported by the end frame 14 so as to leave the horizontal space between the sprockets 21 and 22 entirely open. At the opposite end of the machine the sprocket 24 is in the form of a wheel supported on and keyed to a cross-shaft 28 carried by horizontally spaced upright frame members 29 and 31 on the bed-plate 12 adjacent to the end frame member 16. The sprocket 23 is here in the form of an annular ring or rim which is supported on a plurality of rollers 32 carried by a ring supporting member 33 which is secured at the top and bottom sides thereof to the frame members 29 and 31 and at diametric horizontal portions by arms 34 and 36 secured to the upright frame members 29 and 31. As will be clear from the drawings, the sprockets 21 and 22 are of the same diameter and sprockets 23 and 24 are of the same diameter but substantially larger than sprockets 21 and 22. By reason of this construction the adjacent sides of the chains 18 and 19 are carried in parallelism throughout their entire length. A drive shaft 37 for the sprockets and chains is here supported upon portions 38 of the end frame 14 and carries a pair of spaced sprockets 39 which are in turn connected by chains 41 to sprockets 42 secured on and keyed to the stub shafts 26 and 27. Any suitable drive means such as a motor or the like may be connected to the drive shaft 37 for driving the sprockets and chains. Horizontal tie rods and spacers 43, 44 and 46 are preferably used to connect the pairs of end frames 14, the pairs of vertical frame members 29 and 31, and the pair of opposite end frames 16, and in addition longitudinal guard rail and brace members 47 and 48 are preferably used to connect the upper ends of end frames 14 and frame members 29 and 31 to provide rigidity for the supporting structure.

The chains 18 and 19 are connected together by a plurality of longitudinally spaced horizontal parallel cross-rods 49 which are pivotally supported at their opposite ends 51 and 52 to the links and spacers of the chains 18 and 19 to permit rotation of the cross-rods about their longitudinal axis. Carried at the mid-portion of each of the cross-rods 49 is a hook member 53 which is positioned radially outward adjacent the end sprockets 21 and 22 to engage the intermediate portion 54 of an elongated strip of dough 56 which is supplied to the hooks from the discharge plate 57 of the dough molder. From this end of the machine the dough strip is carried by the hooks with the opposite ends or sides 58 and 59 of the dough strip depending from the hook carrying intermediate portion 54 of the strip whereby the ends 58 and 59 are automatically folded, due to the weight and flexibility of the strips, into a pair of depending legs or sides and thereby fashioning the strip into an inverted U-shaped member. As the strip reaches the opposite end of the machine, the depending free ends 61 and 62 of the dough strip are received in a plurality of clamp members 63 which are automatically closed and moved in a common circular path with the hook members 53 and at a synchronous speed therewith. During this joint movement of the hooks and clamp members, the hook members are rotated relative to the clamp members to cause a twisting of the legs 58 and 59 of the strip about one another and at the completion of this twisting operation, which terminates at approximately a horizontal position of the strip, the intermediate portion 54 of the strip is automatically cut or severed by a knife 64 and the strip automatically released from the clamp member 63 and from the hook 53 and is deposited upon a discharge conveyor 66. The hooks are then brought back along the lower side of the conveyor for removing another strip of dough from the molder discharge plate.

The hook members 53 are positioned radially outward from the axis of the sprockets 21 and 22 as aforementioned at the dough strip receiving end of the machine by means of a circular shaped guide 67 (see Figures 1, 2 and 5) which is fixed to one of the end frames 14 and which engages one side 68 of a slipper 69 fixed to the cross-rods 49 carrying the hook members. Preferably, the guide is circular over the majority of its length and is substantially tangential to its circular form at its opposite ends 71 and 72 to facilitate the engagement and dis-engagement of the slipper 69. As the hook members 53 approach the receiving end 72 of the guides, the hook members depend from the chains, due to the balance of weight around the cross-rods 49 and as the slipper engages and rides over the guide 67, the cross-rod is gradually turned so that the hook member is brought up to a horizontal position at a height corresponding to the aligned axis of the stub shafts 26 and 27. In this position of the hook members the same move through an opening or slot 73 (see Figure 2) provided in the end of the discharge plate 57 of the molder so that the hook member will receive and pick up the most forward strip of dough on the discharge plate. As the hook member is carried above this horizontal position the tangential end portion 71 of the guide causes a release of the slipper from the guide and the hook members again return to a depending position as they are carried along the upper flight of the conveyor towards the opposite end of the machine. Due to the soft and pliant consistency of the kneaded dough, the strips by reason of their support at the intermediate or center portion of the strip, are self-folding into the inverted U-shaped form above described, and during travel of the strips with the hooks along the upper flight of the conveyor, the intermediate portion 54 of the strip will be carried uppermost in the hook members with the free ends 61 and 62 of the strip leg portions depending therefrom.

The clamp member 63 are carried at the outer ends of a plurality of spokes or arms 74 which are in turn secured at their inner end to a hub 76 carried on and fastened to the shaft 28 to thereby support the clamp member 63 for rotation concentric with the sprockets 23 and 24 and concentric with the movement of the hook members as the same are carried around that portion of the conveyor supported by the sprockets 23 and 24. The clamp members are each formed of a pair of spaced plates 77 and 78, the plate 77 being fixed to a base portion 79 of the clamp member and the plate 78 being rotatably carried by the base 79 for movement to and from the plate 77. As here shown, in Figure 14, the plate 78 is secured to and forms an extension from a sleeve 81 which is rotatably carried on the cylindrical body portion of a bolt 82 fastened to the base 79 of the clamp member, whereby the plate 78 may be rotated about its pivotal axis to and from a parallel clamping position with respect to the plate 77. A spring arm 83 is secured to one end 84 of the sleeve 81 and is adapted to engage and ride over a circular guide 86 supported at its opposite ends 87 and 88 on bolts 89 and 91 secured to the upright frame member 29 and the supporting arm 36 respectively. Preferably, and as shown in Figure 1, the guide 86 is formed of two pieces 92 and 93 slidably connected together by a slip-joint 94 to permit variation in length of the guide and the bolts 89 and 91 are carried in elongated radial slots 96 and 97 for adjusting the radial position of the guide. In this manner both the length and radial position of the guide may be adjusted to correspond with an adjusted radial position of the clamp members 63 and spokes or arms 74. Normally the movable side 78 of the clamp will assume an open position during rotation of the clamp members until the spring arm 83 engages the guide 86 when the side 78 is rotated into a closed position with respect to the opposite clamp side 77. In accordance with the present construction, the end 87 of the guide is positioned substantially vertically over the axis of the shaft 29 so that the clamps will approach a vertical position with the clamp open so as to receive the depending free ends of the dough strip and will be automatically closed as the clamps move away from such open position, so as to clamp and hold the free ends of the dough strip. The opposite end 88 of the guide is positioned at approximately a horizontal radial position with respect to the axis of the shaft 29, so that the dough strip ends will be automatically released from the clamps as the twisted dough strip reaches a horizontal position where, as aforementioned, the same is deposited on the discharge conveyor 66.

In accordance with the present construction the clamp members 63 may be radially adjusted relative to their axis of rotation as aforementioned, and as here shown such adjustment is effected by radially displacing the spokes or arms 74. In the form of the invention illustrated in Figures 11 to 13, the spokes 74 are formed of inner and outer telescopic sections 98 and 99, the former being secured to the hub 76 and being hollow so as to slidably receive the inner end 101 of the outer section 99. The outer section 99 is threaded and is threadably engaged by a nut 102 rotatably supported in the outer end of the inner section. The nut 102 is formed in part as a beveled gear 103 which is engaged by a ring gear 104 which extends around the assembly concentric to the shaft 28. As here shown, the ring gear 104 is supported on a ring plate 106 and is secured thereto for clamping in adjusted rotated position by means of one or more clamp members 107 secured to the plate 106. The ring gear may be provided with a handle 108 as here shown, for ready turning of the gear. In accordance with this construction it will be seen that as the ring gear is rotated, all of the nuts 102 will be rotated in unison to effect a joint inward or outward movement of the movable spoke sections. In order to prevent rotation of the outer spoke sections which would cause an improper alignment of the clamp member 63 with the hook member 53, the inner end 101 of the outer section may be formed eccentric to the threaded portion of the outer section whereby the engagement of the eccentric end 101 in the cylindrical barrel of the inner spoke section will hold the outer section against rotation relative to the inner section. In the form of the invention illustrated in Figures 17 to 19, the outer spoke section 99' is provided with a plurality of longitudinally spaced teeth 109 which are engaged by spiral teeth 111 formed in a face 112 of a scroll ring 113. Due to the engagement of the plate sides of the scroll ring 113 and the plate sides of the outer spoke section 99, the outer spoke section is effectively held against rotation without the use of any other construction, such as the eccentric end of the above embodiment. Also, this modified construction obviates the use of numerous bevel pinions 103 and nuts 102 of the first embodiment. The scroll ring may be supported on the assembly in the same manner as the ring gear 104 of the first embodiment.

During the travel of the conveyor around the sprockets 23 and 24, the hook members 53 are held radially inward in radial alignment with the clamp members 63. This positioning of the hook members is effected in the present construction by the engagement of a side 114 of the slipper 69 with a circular guide member 116 supported at the end of the machine between the outer ends of the end frames 29—31, and 16. In accordance with this construction, the slipper side 114 is engaged by the guide as the cross-rods 49 arrive at a vertical position over the axis of the shaft 29, and the slipper is thereafter engaged by the guide to hold the hook members in a radial position until the cross-rods reach a substantially horizontal position with respect to the axis of the shaft 29 when the slipper is disengaged from the guide and the hook members allowed to rotate downwardly, which automatically releases the dough strip from the hook member for deposit on the conveyor 66.

The rotation of the hook members relative to the clamp members during the joint travel of these members as aforementioned, is here effected by operatively connecting a pinion 117 to each of the hook members and which is engaged by a circular rack 118 supported at the discharge end of the machine in a position between the upper ends of the end frames 29—31, and 16. The hook members, as here shown, are substantially of L-shape and include a back plate 137 and forwardly projecting prongs 138. As will be understood, the hook member so formed will be effective to support the intermediate portion of the dough strip so long as either the prongs or the back plate underlie the strip, as is the case during the travel of the hook members from the time of engagement thereof with the strip to the upper end of the conveyor over the axis of shaft 29. Thereafter and during the rotation of the hook members, some means need be provided for closing the open side of the hook member so as to retain the dough strip thereon. Such a means is here provided in the form of a latch-plate 139 which is pivotally supported along one side thereof to a pair of ears 141 carried by the back plate 137 of the hook member, whereby the latch-plate is supported for movement into and from a parallel position relative to the back plate for closing the open side of the hook. In the closed position of the latch-plate the same engages over the forwardly projecting prong 138. Normally the latch-plate is held outwardly extended from the back plate 137 by means of a pair of springs 142.

In accordance with the present construction, the hook members are normally held against rotation relative to the cross-rods during all portions of the travel of the hook members with the conveyor, except that portion of the travel in which the hook members are rotated, so that the rotated position of the hook members may be fixed and determined during all parts of their travel. Means is here provided for effecting a closing of the latch-plate during the movement of the hook members from a vertical to a horizontal position relative to the axis of shaft 29 and for releasing the hook members for rotation relative to the cross-rods during a part of this movement. The construction for controlling the closing of the latch-plate and the rotation of the hook members is detailed in Figures 15 and 16. With reference to these figures, it will be seen that each cross-rod 49 is constructed of a pair of rod sections 119 and 121 which are secured together at the center of the cross-rod by means of a center block 122. Mounted through a bore 123 in this block at right angles to the axis of the cross-rod 49 is a shaft 124 which is normally held against rotation in the block by means of a key 126 carried by the shaft and engaged in key slots 128 and 129 formed partway through the bore 123. The shaft may be freed for rotation in the bore by displacing the shaft therein to disengage the keys from the key slots. A carriage member 131 for the hooks 53 is rotatably secured to the block 122 in alignment with the shaft 124 by means of a block section 132, here bolted to the block. The carriage 131 is provided with an open interior portion 133, in one end of which is mounted an end 134 of the hook backing plate 137. Also mounted in the carriage is a helical spring 136 which is compressed between the clamp end 134 and one end 143 of a sliding arm 144 for actuating the latch-plate 139. The arm 144 is slidably carried in a tubular boss 146 extending laterally from the carriage 131. The arm end 143 extends laterally into the interior chamber of the carriage and is there engaged between the upper end of the spring 136 and the lower end 147 of the shaft, so as to support the shaft in an outwardly pressed position in the bore of the block engaging the keys 126 and 127 in the key slots 128 and 129. The shaft is retained at the outer end of the block by means of a ring 148 bolted to the block and surrounding the shaft and engaging a shoulder 149 on the shaft. The pinion 117 is keyed to the outer end of the shaft and secured in place thereon by means of a nut 151 threaded on the outer shaft end. In accordance with this construction, the inward displacement of the shaft will cause first a displacement of the latch-plate 139 to a closed position by the inner end 152 of the arm 144, and then a release of the shaft for rotation relative to the block 122.

Means for causing the inward displacement of the shaft 124 in the block 122 as above described, is here provided in the form of a generally circular shaped guide 153 (see Figures 1, 3 and 9) which is formed with a radial flange 154 secured at its opposite ends to the tie-rods 44 and 46. The upper end 156 of the guide 153 extends from a position forwardly of the tie-rod 44 while the opposite end 157 of the guide extends to a position spaced slightly above the tie-rod 46. The length of the radius of curvature of the guide 153 is such as to cause the engagement of the guide with the nut 151 on the shaft and cause an inward displacement of the shaft for a distance only sufficient to close the latch-plate 139 without releasing the shaft for rotation. In this manner the hook members are closed as the same approach a vertical position over the shaft 29 and are automatically opened as the shaft is released from the end 157 of the guide adjacent but slightly above the conveyor 66. During that part of the travel of the conveyor during which the hook members are rotated, we secure a circular guide shim 158 (see Figures 1 and 9) which is operative to engage the nut 151 and depress the shaft a sufficient distance in the block 122 to release the shaft for rotation. The rack 118 is preferably formed as a part of this shim and the whole member including the shim and rack is bolted to the guide 153, so that the shim and rack may be readily applied or removed as a unit and such units of various lengths applied to secure a desired amount of rotation of the hook members. In the present machine the length of the rack 118 is arranged to effect a rotation of the hook members through about two and one-half revolutions. It will be clear, however, that by changing the length of the rack and shim member, any desired amount of rotation may be imparted to the hook members.

The knife 64 mentioned in the foregoing is mounted vertically on the frame support with the upper blade end 159 of the knife mounted in the path of movement of the hook members 53. In accordance with this arrangement, the back member 137 of the hook members and the latch-plate 139 are provided with aligned slots 161 and 162 (see Figure 15) which enable the knife to pass through the hook member and latch-plate between the prongs 138 and 139 to sever the dough strip at the folded portion thereof. The position of the knife blade is such as to cause a cutting through of the dough strip before lifting of the latch-plate (see Figures 9 and 10) and immediately upon cutting through of the dough by the knife, the latch-plate is lifted and the strip deposited upon the conveyor 66.

The conveyor 66 in the present machine is of an endless belt type and is constructed of a plurality of belt strips 163, 164, 166 and 167, which are supported in side-by-side relation and extend horizontally from the discharge end of the machine in substantially parallel relation to the axis of rotation of the sprockets. The two inwardly positioned belt sections 164 and 166 are supported upon a roller 168 (see Figure 3) adjacent to the sprocket wheel 24 and extend across the path of movement of the clamp members 63 and the hook members 53. The outer edge 169 of the belt section 166 is preferably spaced somewhat from the blade end 159 of the knife so that the dough strip cut by the knife may fold downwardly over the edge 169 to clear the knife. This spacing is not critical inasmuch as the movement of the strip by the belt against the knife will cause the pliant strip end to bend away from the knife. The outer belt sections 163 and 167 are supported forwardly of the roller 168 upon a roller 171 which is somewhat below the axis of roller 168 and the belt sections 163 and 167 are carried in common with sections 164 and 166 over a roller 172 located at substantially the plane of end frame 29 so as to position the remainder of the length of the belt sections to the discharge end 173 thereof in parallel relation. The belt sections 163 and 167 moving between rollers 171 and 172 act to pick up and elevate the opposite ends of the strip.

In order to provide a release of the dough strips from the hook members 53 at the conveyor 66, it is essential that the hook members arrive at the conveyor with the back plate 137 of the hook members lowermost. In this connection it will be noted that the hook members as carried over the upper flight of conveyor 17 are positioned with the back plate 137 in a leading position. Consequently, if the hook members are rotated through anything but a whole number of revolutions, the hook members will not be properly positioned at the conveyor as above described. In the present case, where it is desired to rotate the hook members through two and one-half revolutions, and in any case where it is desirable to rotate the hook members through a whole number and a half revolution, it is necessary to re-orient the hook members prior to the start of the rotation causing the twisting action of the dough strip. Accordingly, in the present machine, we mount a rack and shim section 174 (see Figures 1 and 8) similar in construction to the rack and shim section above described, adjacent the upper end of the conveyor ahead of a vertical position over the shaft 29 and which is of appropriate length as to turn the hook members through one-half of a revolution. This turning of the hook member is completed prior to the closing of the clamp members 63. While the rack section 174 is of a length providing a rotation of the hook members through a one-half revolution in order to make up for the odd one-half revolution imparted to the hook members by the rack section 118, it will be understood that the essential purpose of the rack section 174 is to complete any fractional revolution of the hook member caused by the rack section 118, and hence the rack sections may be thus selected in length to provide a twisting of the dough strips by a whole number of revolutions plus a fractional revolution other than a one-half revolution.

In addition to the novel construction of the machine above described, the present invention also resides in an improved process of forming a loaf of bread or the like from straight strips of dough in pliant condition, which consists in first lifting the intermediate part of the strip so as to apply a force to the strip at the middle thereof to cause a bending of the strip into a U-shaped form, and thereafter supporting and moving the strip in such form, and rotating one end portion of the strip relative to the other, whereby the legs of the strip will be twisted about one another and finally depositing the twisted strip for support on its sides and severing the strip at the middle folded part so as to prevent an unfolding of the twisted legs.

We claim:

1. A dough strip twisting machine comprising, a support for longitudinal strips of dough, a conveyor mounted for movement to and from said support, means carried by said conveyor and positioned to engage and carry away one of said strips and engaging said strip intermediate the ends thereof to cause a depending of the free ends of the strip from the means, a member mounted under the path of movement of said means and formed to receive and hold the depending free strip ends, and means providing a relative rotational displacement between said means and said member for twisting the legs of the strip around each other.

2. A dough strip twisting machine comprising, a support for strips of dough, a member mounted for movement into cooperative relation to said support to engage and carry away one of said strips intermediate the ends of said strip and with the free ends of said strip depending from said member and a strip loop formed upon said member, a second member mounted for movement with said first member and operative to engage and hold the depending free strip ends, means for moving said members, means for rotating one of said members with respect to the other to twist the legs of said strip around each other, and a knife positioned to engage and sever said loop after twisting of said strip.

3. A dough strip twisting machine comprising, a chute for receiving a plurality of strips of dough and formed to support said strips in longitudinal form and to advance said strips in succession to one end of said chute, said chute end being formed to expose an intermediate portion of the foremost strip thereon, a conveyor movable to and from said chute end, a hook carried by said conveyor and positioned to engage the foremost strips in said chute at the exposed intermediate portion of said strip and to carry away said strip by supporting said intermediate portion to cause the opposite free ends of the strip to depend from said means, a member mounted under the path of movement of said conveyor and adapted to receive and hold said free strip ends, and means causing a relative rotation between said first means and said member to twist the opposite sides of said strip about each other.

4. A dough strip twisting machine comprising, a chute for receiving a plurality of strips of dough and arranged to advance said strips in succession to one end of said chute, said chute end being formed to expose an intermediate portion of the foremost strip thereon, conveyor means movable to and from said chute end and operative to engage the foremost strip in said chute at the intermediate portion of said strip and to carry away said strip by supporting said intermediate portion to cause the opposite free ends of the strip to depend from said means, a member mounted under the path of movement of said conveyor and adapted to receive and hold said free ends, means causing a relative rotation between said first means and said member to twist the opposite sides of said strip about each other, means operative in timed relation to said last named means to engage and sever the intermediate portion of said strip after twisting thereof, and means operative to release said strip from said first means and said member after severing of said strip.

5. A dough strip twisting machine comprising, an endless conveyor, means carried by said conveyor for engaging and holding an intermediate portion of a strip of dough, a wheel supporting one end of said conveyor, means mounted concentric with said wheel and for joint rotation therewith and positioned inwardly of said conveyor and adapted to engage and hold the free ends of said strip, and means causing a rotation of one of said first means relative to the other and about an axis radially disposed relative to said wheel for twisting the sides of said strip around each other.

6. A dough strip twisting machine comprising, an endless conveyor, supporting wheels at opposite ends of said conveyor, hooks carried by said conveyor, means positioning said hooks radially outward during their travel around one of said wheels for engagement with the intermediate portion of an elongated strip of dough, means positioning said hooks radially inward during travel thereof around the other of said wheels, means mounted concentrically of said last named wheel and connected for synchronous rotation therewith and adapted to engage and hold the free ends of said dough strip, means rotating said hooks about an axis radial of said last named wheel during a part of the travel of said hooks about the axis of said wheel, a knife mounted adjacent to said last named wheel and positioned to sever said strip at said intermediate portion, and conveyor means mounted to receive said strips from said hooks and said third named means adjacent to said knife.

7. A dough strip twisting machine comprising, an endless conveyor, supporting wheels at opposite ends of said conveyor, hooks carried by said conveyor, means for supporting a plurality of strips of dough adjacent one of said wheels, means positioning said hooks radially outward during their travel around the axis of said last named wheel for engagement with an intermediate portion of the foremost strip carried by said supporting means, means positioning said hooks radially inward during travel thereof around the other of said wheels, means mounted concentrically with said last named wheel and connected for synchronous rotation therewith and including a plurality of circumferentially spaced clamps adapted to receive the depending free ends of strips of dough carried by said hooks, means closing said clamps on said strip ends upon movement of said clamps into a vertical position under one of said hooks, means causing the rotation of said hooks about an axis radial of said last named wheel during part of the travel of the hooks between a vertical and horizontal position on the periphery of said wheel, means causing the opening of said clamps adjacent to a horizontal position thereof for releasing said strips, a knife mounted in the travel of said hooks adjacent said horizontal position thereof for severing the folded end of said strip, and conveyor means mounted to receive said strips from said hooks and clamps after opening of said clamps and severing of the dough by said knife.

8. A dough strip twisting machine comprising, an endless conveyor, a wheel supporting one end of said conveyor, a plurality of hooks carried by said conveyor for engagement with the intermediate portions of elongated strips of dough, means positioning said hooks radially inward during travel thereof around the axis of said wheel, a plurality of clamp members mounted concentrically of said wheel and supported for synchronous rotation therewith and adapted to receive and hold the free ends of said strips during movement of said hooks and clamp members around a portion of the periphery of said wheel, said hooks being mounted on said conveyor for rotation about an axis perpendicular to the direction of movement of the conveyor, a pinion secured to each of said hooks, and a circular rack mounted adjacent said wheel at said peripheral portion in a position to enmesh with said pinions for rotating said hooks during movement of said hooks over said peripheral portion.

9. A dough strip twisting machine comprising, an endless conveyor, supporting wheels at the opposite ends of said conveyor, hooks carried by said conveyor, means positioning said hooks radially outward during their travel about the axis of one of said wheels for engagement of said hooks with the intermediate portions of elongated strips of dough, means positioning said hooks radially inward during travel thereof around the axis of the other of said wheels, a plurality of clamp members mounted concentrically of said last named wheel and supported for synchronous rotation therewith and adapted to receive and hold the free ends of said strips during movement of said hooks and clamp members around a portion of the periphery of said last named wheel, said hooks being mounted on said conveyor for rotation about an axis perpendicular to the direction of movement of the conveyor, a pinion secured to each of said hooks, and a circular rack mounted adjacent said last named wheel at said peripheral portion in a position to enmesh with said pinions for rotating said hooks during movement of said hooks over said peripheral portion.

10. A dough strip twisting machine as characterized in claim 8 including means for adjusting the radial position of said clamp members relative to said hooks at said last named wheel.

11. A dough strip twisting machine comprising, an endless conveyor, a wheel supporting one end of said conveyor, a plurality of hooks carried by said conveyor for engagement with the intermediate portions of elongated strips of dough, means positioning said hooks radially inward during travel thereof around the axis of said wheel, a plurality of clamp members mounted concentrically of said wheel and supported for synchronous rotation therewith and adapted to receive and hold the free ends of said strips during movement of said hooks and clamp members around a portion of the periphery of said wheel, said hooks being mounted on said conveyor for rotation about an axis perpendicular to the direction of movement of the conveyor, a pinion secured to each of said hooks, a circular rack mounted adjacent said wheel at said peripheral portion in a position to enmesh with said pinions for rotating said hooks during movement of said hooks over said peripheral portion, said hooks being provided with a slotted portion, and a knife supported in the path of movement of said hooks adjacent the end of said peripheral portion and movable through the slotted portion of said hooks to sever the intermediate portion of said dough.

12. A dough strip twisting machine comprising, an endless conveyor, a wheel supporting one end of said conveyor, a plurality of hooks carried by said conveyor for engagement with the intermediate portions of elongated strips of dough, means positioning said hooks radially inward during travel thereof around the axis of said wheel, a plurality of clamp members mounted concentrically of said wheel and supported for synchronous rotation therewith and adapted to receive and hold the free ends of said strips during movement of said hooks and clamp members around a portion of the periphery of said wheel, shafts connecting said hooks to said conveyors for rotation of said hooks about an axis perpendicular to the direction of movement of said conveyor, said shafts being supported for longitudinal movement thereof, means locking said shafts against rotation in one longitudinal position and releasing said shafts for rotation in a second longitudinal position, resilient means normally holding said shafts in locked position, pinions carried by said shafts, a circular rack supported adjacent said wheel at said peripheral portion aforementioned, and positioned to enmesh with said pinions, and guide means adjacent said rack engageable with said shafts for displacing said shafts to the second named longitudinal position thereof for permitting rotation of said pinions on said rack.

13. A dough strip twisting machine comprising, an endless conveyor, a wheel supporting one end of said conveyor, a plurality of hooks carried by said conveyor for engagement with the intermediate portions of elongated strips of dough, means positioning said hooks radially inward during travel thereof around the axis of said wheel, a plurality of clamp members mounted concentrically of said wheel and supported for synchronous rotation therewith and adapted to receive and hold the free ends of said strips during movement of said hooks and clamp members around a portion of the periphery of said wheel, said hooks being mounted on said conveyor for rotation about an axis perpendicular to the direction of movement of the conveyor, a pinion secured to each of said hooks, a circular rack mounted adajacent said wheel at said peripheral portion in a position to enmesh with said pinions for rotating said hooks during movement of said hooks over said peripheral portion, latch members pivotally carried by said hooks and arranged in a closed position thereof to secure the dough strips on said hooks during rotation of the hooks and in an open position to release the dough strips from said hooks, and means operative to close said latch members upon movement of said hooks to the beginning of said peripheral portion and to open said latch members adjacent the end of said peripheral portion.

14. A dough strip twisting machine comprising, an endless conveyor, a wheel supporting one end of said conveyor, a plurality of hooks carried by said conveyor for engagement with the intermediate portions of elongated strips of dough, means positioning said hooks radially inward during travel thereof around the axis of said wheel, a hub mounted concentric with said wheel and rotatable therewith, a plurality of radially extending arms carried by said hub and extendible and contractible in a radial direction relative to said hub, said arms being threaded longitudinally, threaded nuts rotatably carried by said hub and engaged on said arms, pinions secured to said nuts, an annular ring gear rotatably carried by said hub and engageable with said pinions and adapted on rotation to displace said arms in a radial direction, clamp members carried on the outer ends of said arms and adapted in a vertical position of said arms to receive and hold the free ends of said dough strips, and means rotating said hooks relative to said clamp members for twisting the sides of the dough strips.

15. A dough strip twisting machine comprising, an endless conveyor, a wheel supporting one end of said conveyor, a plurality of hooks carried by said conveyor for engagement with the intermediate portions of elongated strips of dough, means positioning said hooks radially inward during travel thereof around the axis of said wheel, a hub mounted concentric with said wheel and rotatable therewith, a plurality of radially extending arms carried by said hub and extendible and contractible in a radial direction relative to said hub, said arms each being provided with a plurality of longitudinally spaced teeth, a ring member rotatably carried by said hub and provided with a spiral thread in an annular face thereof engaged with the teeth on said arms whereby upon rotation of said ring member said arms will be displaced radially of said hub, clamp members carried on the outer ends of said arms and adapted in a vertical position of said arms to receive and hold the free ends of said dough strips, and means rotating said hooks relative to said clamp members for twisting the sides of the dough strips.

WALTER HOOP.
LEO C. VEALE.